US008427853B2

(12) United States Patent
Uno

(10) Patent No.: US 8,427,853 B2
(45) Date of Patent: Apr. 23, 2013

(54) POWER FACTOR CORRECTION CONVERTER INCLUDING OPERATION MODE DETERMINATION UNIT

(75) Inventor: Yoshiyuki Uno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/233,083

(22) Filed: Sep. 15, 2011

(65) Prior Publication Data
US 2012/0235649 A1 Sep. 20, 2012

Related U.S. Application Data

(63) Continuation of application No. PCT/JP2009/066905, filed on Sep. 29, 2009.

(30) Foreign Application Priority Data

Mar. 18, 2009 (JP) .................................. 2009-065798

(51) Int. Cl.
H02M 7/155 (2006.01)
H02M 7/17 (2006.01)
H02M 7/217 (2006.01)

(52) U.S. Cl.
USPC .................. 363/125; 363/48; 363/82; 363/86

(58) Field of Classification Search .................... 363/44, 363/48, 65, 81, 82, 86, 89, 90, 125, 126; 323/210, 266
See application file for complete search history.

(56) References Cited

U.S. PATENT DOCUMENTS

| 5,742,151 A * | 4/1998 | Hwang ......................... 323/222 |
| 5,804,950 A * | 9/1998 | Hwang et al. ................. 323/222 |
| 5,867,379 A * | 2/1999 | Maksimovic et al. .......... 363/89 |
| 6,388,429 B1 * | 5/2002 | Mao .............................. 323/222 |

(Continued)

FOREIGN PATENT DOCUMENTS

| JP | 02-084069 A | 3/1990 |
| JP | 07-039162 A | 2/1995 |

(Continued)

OTHER PUBLICATIONS

Uno; "Switching Power Supply Apparatus"; U.S. Appl. No. 13/235,571, filed Sep. 19, 2011.

(Continued)

Primary Examiner — Adolf Berhane
Assistant Examiner — Nusrat Quddus
(74) Attorney, Agent, or Firm — Keating & Bennett, LLP

(57) ABSTRACT

A power factor correction converter includes a diode bridge that rectifies an alternating-current voltage input from an alternating-current input power supply Vac, a series circuit including an inductor and a switching element, a rectifying smoothing circuit connected in parallel with the switching element and including a diode and a smoothing capacitor, and a digital signal processing circuit that controls turning on and off of the switching element such that the input current input from the alternating-current input power supply Vac comes to have a similar shape to the alternating-current voltage. The current flowing through the inductor in the off period of the switching element is detected by using a current detection resistor, the operation mode is determined on the basis of the inductor current IL at a predetermined timing and the switching element is optimally controlled in accordance with the operation mode.

16 Claims, 11 Drawing Sheets

U.S. PATENT DOCUMENTS

| | | | |
|---|---|---|---|
| 6,469,917 B1* | 10/2002 | Ben-Yaakov | 363/44 |
| 6,753,798 B2* | 6/2004 | Feldtkeller | 341/143 |
| 6,980,445 B2* | 12/2005 | Fukumoto et al. | 363/45 |
| 7,148,664 B2* | 12/2006 | Takahashi et al. | 323/222 |
| 7,919,950 B2* | 4/2011 | Uno et al. | 323/207 |
| 8,179,703 B2* | 5/2012 | Uno | 363/44 |
| 8,228,696 B2* | 7/2012 | Uno | 363/89 |
| 8,232,780 B2* | 7/2012 | Uno | 323/222 |
| 2004/0160128 A1 | 8/2004 | Athari | |
| 2005/0062143 A1* | 3/2005 | Joshi et al. | 257/678 |
| 2005/0162143 A1* | 7/2005 | Fukumoto et al. | 323/284 |
| 2006/0132104 A1* | 6/2006 | Li | 323/207 |
| 2006/0220622 A1 | 10/2006 | Yamanaka et al. | |
| 2008/0130336 A1* | 6/2008 | Taguchi | 363/125 |
| 2010/0091523 A1* | 4/2010 | Uno et al. | 363/20 |
| 2011/0216558 A1* | 9/2011 | Uno | 363/21.12 |
| 2011/0222318 A1* | 9/2011 | Uno et al. | 363/21.05 |
| 2012/0057382 A1* | 3/2012 | Uno | 363/89 |
| 2012/0155132 A1* | 6/2012 | Uno | 363/80 |

FOREIGN PATENT DOCUMENTS

| | | |
|---|---|---|
| JP | 2003-348849 A | 12/2003 |
| JP | 2006-087192 A | 3/2006 |
| JP | 2006-513682 A | 4/2006 |
| JP | 2006-187140 A | 7/2006 |
| JP | 2006-311780 A | 11/2006 |
| JP | 2007-020305 A | 1/2007 |
| WO | 2004/042793 A2 | 5/2004 |
| WO | 2006/004641 A2 | 1/2006 |

OTHER PUBLICATIONS

Official Communication issued in International Patent Application No. PCT/JP2009/066905, mailed on Dec. 28, 2009.

Official Communication issued in corresponding Japanese Patent Application No. 2010-517623, mailed on Jan. 24, 2012.

* cited by examiner

POWER FACTOR CORRECTION CONVERTER INCLUDING OPERATION MODE DETERMINATION UNIT

BACKGROUND OF THE INVENTION

1. Field of the Invention

The present invention relates to an AC-DC converter that receives an input of an alternating-current power supply voltage and that outputs a direct-current voltage, and in particular relates to a PFC (power factor correction) converter that improves the power factor.

2. Description of the Related Art

General switching power supply devices, which receive a commercial alternating-current power supply as an input power supply, rectify and smooth the commercial alternating-current power supply and thereby convert the commercial alternating-current power supply into a direct-current voltage, and since the direct-current voltage is then switched using a DC-DC converter, the input current becomes discontinuous and significantly distorted from a sine wave. This causes generation of harmonic currents.

In Japan, Europe, and elsewhere, there are regulations concerning harmonic currents, classified in accordance with usage, input power and the like. Accordingly, power factor improvement circuit (PFC) converters, such as the ones described in Japanese Unexamined Patent Application Publication No. 2006-513682 and Japanese Unexamined Patent Application Publication No. 2006-187140, are provided in the power supplies of domestic electrical appliances that are to comply with such regulations.

In general, a PFC converter is formed by a chopper circuit and operates such that the waveform of the input current comes to have a similar shape to the waveform of the input voltage, in other words, such that the waveform of the input current comes to have the shape of a sine wave of the same phase. Accordingly, harmonic currents are suppressed to a certain level or less.

Here, an example configuration of the PFC converter described in Japanese Unexamined Patent Application Publication No. 2006-513682 will be described on the basis of FIG. 1. In the PFC converter of FIG. 1, a rectifier block R rectifies an input alternating-current voltage and an input capacitor Cin removes high-frequency components. When a switch 10 is turned on, electromagnetic energy accumulates in an inductor L. When the switch 10 is turned off, the energy in the inductor L is transferred to a capacitor Cout via a rectifying diode D and a power supply voltage is supplied to a load. When the switch 10 is turned on again, the diode D is cut off and the power supply voltage is output from the capacitor Cout. A one-cycle-control IC (OCC circuit) 20 is input with voltages of an input current detection resistor Rs and output voltage detection resistors R1 and R2 and controls the duty cycle of the switch 10 such that the AC input current comes to have the same phase as the AC input voltage.

However, since it is assumed that the PFC converter of Japanese Unexamined Patent Application Publication No. 2006-513682 will operate in a continuous current mode, if the PFC converter operates in a discontinuous current mode when the load is light, distortions are generated in the input current.

Furthermore, the PFC converter of Japanese Unexamined Patent Application Publication No. 2006-187140 is a multiphase PFC converter and is assumed to operate in a discontinuous current mode, and provided that the on period of switching is made constant throughout a single period of the commercial alternating-current power supply, the input current comes to have the form of a sine wave even when detection and control of the current is not performed. However, in reality, if a state arises in which the load increases and the PFC converter operates in a continuous current mode, distortions are generated in the input current.

SUMMARY OF THE INVENTION

Accordingly, preferred embodiments of the present invention provide a PFC converter that performs optimum harmonic suppression and power factor improvement regardless of whether the operation mode is a continuous current mode or a discontinuous current mode.

According to a preferred embodiment of the present invention, a PFC converter includes a rectifier circuit that rectifies an alternating-current voltage input from an alternating-current input power supply; a series circuit that is connected next to the rectifier circuit and includes an inductor and a switching element; a rectifying smoothing circuit that is connected in parallel with the switching element; a switching controller that controls the switching element such that an input current input from the alternating-current input power supply is caused to have a similar shape to the alternating-current voltage; a current detector that detects a current flowing through the inductor; an operation mode determination unit that determines whether an operation mode is a continuous current mode or a discontinuous current mode, wherein, in a case where the operation mode is the continuous current mode, the switching controller controls the switching element such that an average value of the current flowing through the inductor detected by the current detector changes in the form of a sine wave and in a case where the operation mode is the discontinuous current mode, the switching controller controls an on period of the switching element to be constant throughout a voltage change period of the alternating-current input power supply such that a peak value of the current flowing through the inductor changes in the form of a sine wave.

In addition, according to another preferred embodiment of the present invention, a PFC converter includes a first series circuit that is connected in parallel with output ports and includes a first switching element and a first rectifying element; an inductor that is connected between a connection point of the first switching element and the first rectifying element and a first input terminal of an alternating-current input power supply; a second series circuit that is connected in parallel with the output ports, includes a second switching element and a second rectifying element and in which a connection point of the second switching element and the second rectifying element is connected to a second input terminal of the alternating-current input power supply; a smoothing circuit that is connected in parallel with the output ports; a switching controller that controls the switching elements such that an input current input from the alternating-current input power supply is caused to have a similar shape to an alternating-current voltage; a current detector that detects a current flowing through the inductor; an operation mode determination unit that determines whether an operation mode is a continuous current mode or a discontinuous current mode, wherein in a case where the operation mode is the continuous current mode, the switching controller controls the switching elements such that an average value of the current flowing through the inductor detected by the current detector changes in the form of a sine wave and in a case where the operation mode is the discontinuous current mode, the switching controller controls on periods of the switching elements to be constant throughout a voltage change period of the alternating-current input power supply such that a peak value of the current flowing through the inductor changes in the form of a sine wave.

The determination of the operation mode is performed preferably using any of the following methods (a) to (f).

(a) When L denotes an inductance value of the inductor, Vin denotes the alternating-current voltage, Vo denotes an output voltage of the PFC converter, Ton denotes the on period and Toff denotes an off period of the switching element(s), and a detection value of a current sampled by the current detector at a midpoint of the on period of the switching element(s) is denoted by $I_{Lav}$, when $I_{Lav}-(\frac{1}{2})\times\{(Vo-Vin)/L\}\times Toff$ is substantially positive, the operation mode determination unit regards the operation mode as being the continuous current mode and when $I_{Lav}-(\frac{1}{2})\times\{(Vo-Vin)/L\}\times Toff$ is substantially negative, the operation mode determination unit regards the operation mode as being the discontinuous current mode.

(b) When L denotes an inductance value of the inductor, Vin denotes the alternating-current voltage, Vo denotes an output voltage of the PFC converter, Ton denotes the on period and Toff denotes an off period of the switching element(s), and a detection value of a current sampled by the current detector at an endpoint of the on period of the switching element(s) is denoted by ILp, when $ILp-\{(Vo-Vin)/L\}\times Toff$ is substantially positive, the operation mode determination unit regards the operation mode as being the continuous current mode and when $ILp-\{(Vo-Vin)/L\}\times Toff$ is substantially negative, the operation mode determination unit regards the operation mode as being the discontinuous current mode.

(c) When a detection value of a current sampled at a midpoint of an off period of the switching element(s) detected by the current detector is smaller than a detection value of a current sampled at a midpoint of an on period of the switching element(s) detected by the current detector, the operation mode is regarded as being the discontinuous current mode and otherwise the operation mode is regarded as being the continuous current mode.

(d) A switching element voltage detection circuit is further provided that detects a voltage between terminals of the switching element(s) and the determination is made on the basis of a change in the voltage detected by the switching element voltage detection circuit during an off period of the switching element(s). That is, if the voltage between the terminals of the switching element(s) is not constant and falls during the off period of the switching element, the operation mode is regarded as being the discontinuous current mode and if the voltage is constant the operation mode is regarded as being the continuous current mode.

(e) An auxiliary coil is further provided that is coupled with the inductor and the determination is made on the basis of a change in a voltage generated in the auxiliary coil during an off period of the switching element(s). That is, if the voltage generated in the auxiliary coil during the off period of the switching element(s) is not constant and falls, the operation mode is regarded as being the discontinuous current mode, and if the voltage is constant, the operation mode is regarded as being the continuous current mode.

(f) The determination is made on the basis of a current value sampled by the current detector immediately before turning on of the switching element(s). That is, if the current flowing through the inductor immediately before turning on of the switching element(s) is zero, the operation mode is regarded as being the discontinuous current mode, and if the current flowing through the inductor immediately before turning on of the switching element(s) is not zero, the operation mode is regarded as being the continuous current mode.

In addition, the switching controller and the operation mode detector of the PFC converter according to a preferred embodiment of the present invention are preferably provided by a digital signal processor (DSP) that holds digital values detected by the current detector.

According to various preferred embodiments of the present invention, the operation mode is determined to be either the continuous current mode or the discontinuous current mode and the waveform of the current is caused to have a similar shape to and be of the same phase as the waveform of the voltage in accordance with the determined mode, and therefore harmonic suppression and the power factor are improved regardless of the weight of the load.

In addition, mode determination can be performed by performing current value sampling up to two times per switching period and therefore the amount of arithmetic processing is small and the burden on the processor, such as the DSP, is small. Consequently, even a processor having a comparatively low speed can be used.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A PFC converter according to a first preferred embodiment of the present invention will be described with reference to FIGS. 2 to 5B.

Figure 1:
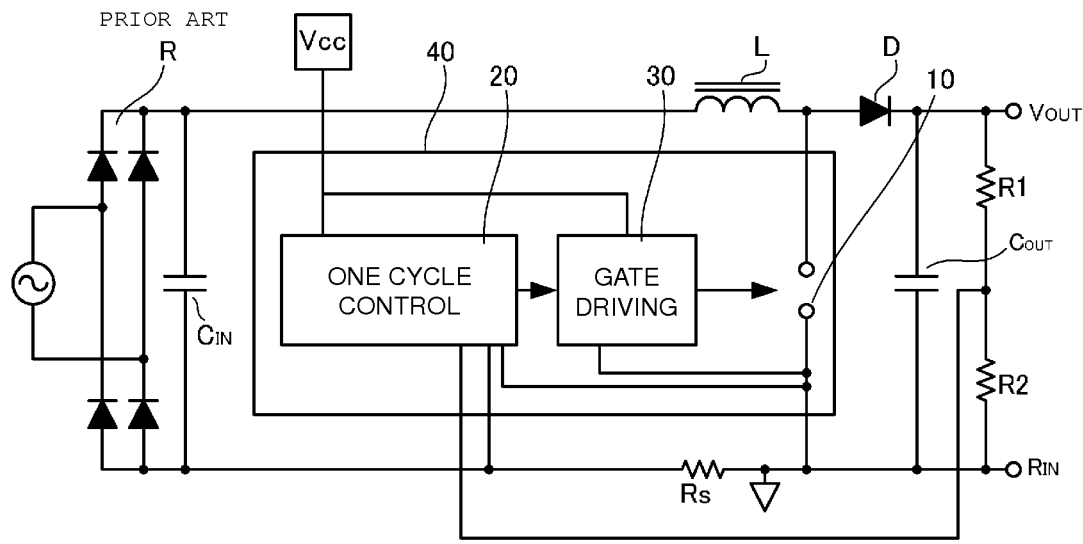
FIG. 1 is circuit diagram of a PFC converter described in Japanese Unexamined Patent Application Publication No. 2006-513682.
Figure 2:
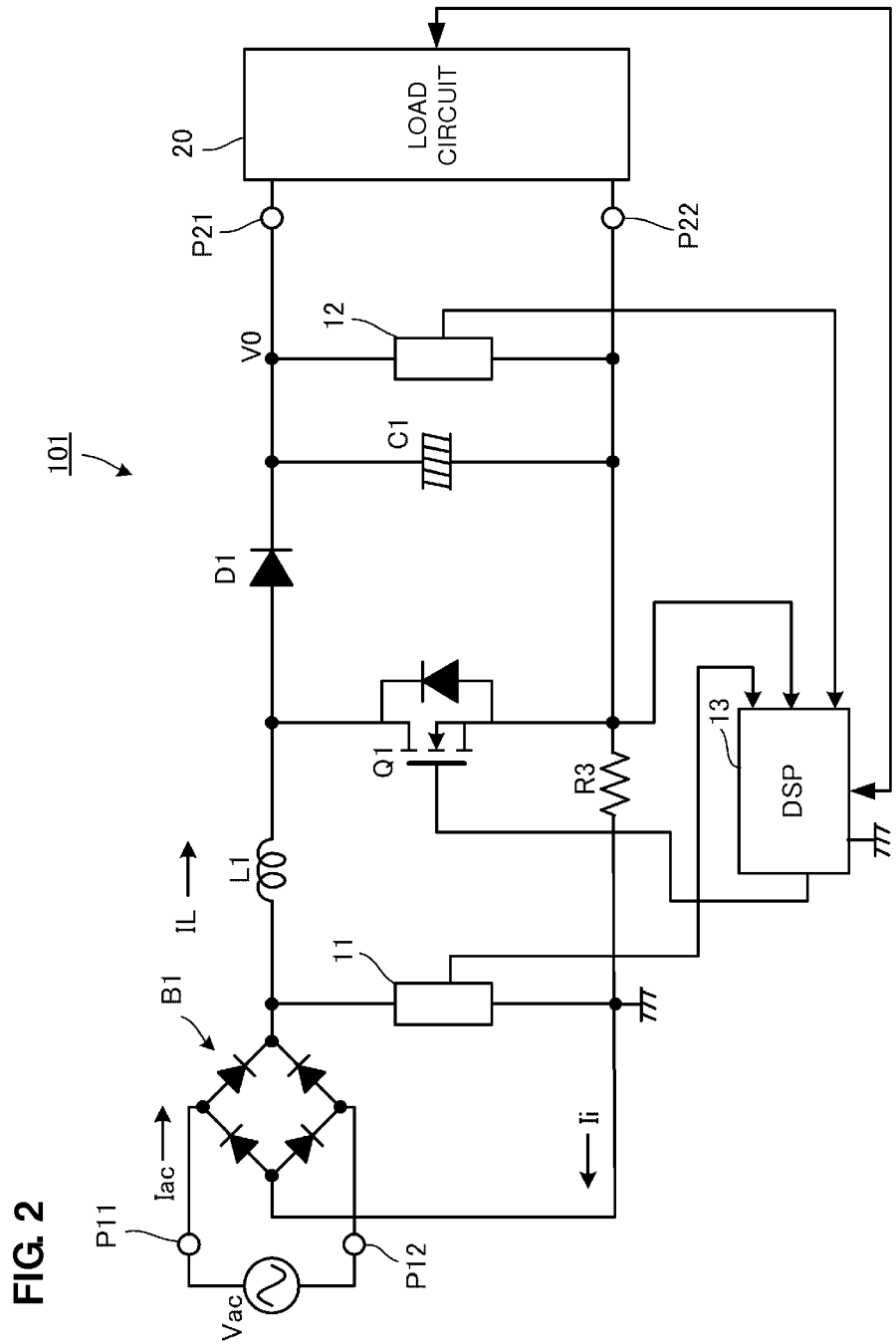
FIG. 2 is circuit diagram of a PFC converter 101 according to a first preferred embodiment of the present invention.

FIG. 2 is a circuit diagram of a PFC converter 101 according to a first preferred embodiment of the present invention. In FIG. 2, symbols P11 and P12 denote input ports of the PFC converter 101 and symbols P21 and P22 denote output ports of the PFC converter 101. An alternating-current input power supply Vac, which is a commercial alternating-current power supply, is input to the input ports P11 and P12 and a load circuit 20 is connected to the output ports P21 and P22.

The load circuit 20 is, for example, a circuit of an electronic appliance that receives a power supply through, for example, a DC-DC converter or a DC-DC converter thereof.

A diode bridge B1, which is a rectifier circuit that full-wave rectifies an alternating-current voltage of the alternating-current input power supply Vac, is provided in an input stage of the PFC converter 101. In addition to a current detection resistor R3, a series circuit including an inductor L1 and a switching element Q1 is connected to the output side of the diode bridge B1. A rectifying smoothing circuit including a diode D1 and a smoothing capacitor C1 is connected in parallel with the terminals of the switching element Q1. A boost-type chopper circuit includes the inductor L1, the switching element Q1, the diode D1 and the smoothing capacitor C1.

An input voltage detection circuit 11 is provided between the terminals of the output side of the diode bridge B1. In addition, an output voltage detection circuit 12 is provided between the output ports P21 and P22. A digital signal processing circuit 13 preferably includes a DSP and controls the PFC converter 101 by digital signal processing. In other words, the digital signal processing circuit 13 receives an output signal of the input voltage detection circuit 11 and detects the instantaneous voltage of the input alternating-current input power supply. Furthermore, an output signal of the output voltage detection circuit 12 is input and an output voltage is detected. In addition, the switching element Q1 is turned on and off at a predetermined switching frequency.

A processing unit of switching control signals for the switching element Q1, that is, the digital signal processing circuit 13, corresponds to the "switching controller" according to a preferred embodiment of the present invention. Furthermore, the current detection resistor R3 corresponds to the "current detector" according to a preferred embodiment of the present invention.

The digital signal processing circuit 13 preferably includes a port to perform communication with the load circuit 20 and, for example, performs communication of data, is input with and outputs signals, continually sends the state or the like of the converter and sends the input voltage, output voltage, output current and the like to the load circuit (electronic appliance), and reflects a load state and the like received from the load circuit side in the switching control.

Figure 3A:
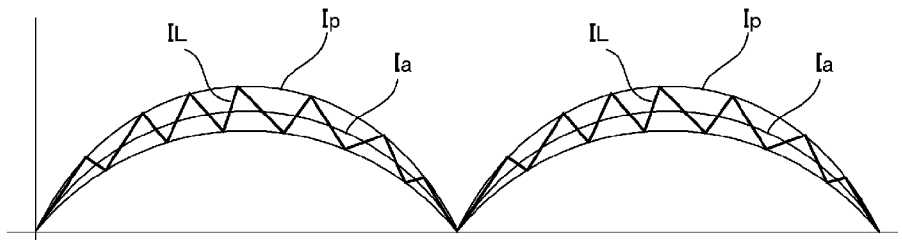
FIGS. 3A and 3B are diagrams illustrating various control methods used by a digital signal processing circuit 13 within the PFC converter 101 according to the first preferred embodiment of the present invention.
Figure 3B:
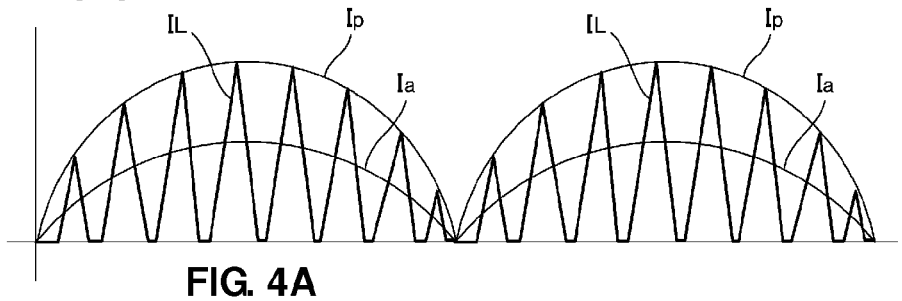

FIGS. 3A and 3B are diagrams illustrating various methods of controlling the PFC converter 101 used by the digital signal processing circuit 13. FIGS. 3A and 3B each illustrate a current waveform for a single period of the alternating-current input power supply. Here, a waveform IL is the waveform of a current flowing through the inductor L1 in the PFC converter 101 illustrated in FIG. 2. Ip is an envelope of peak values of the current (peak current) and Ia is an envelope of average values of the current (average current). However, for convenience of illustration, in cases where the switching frequency of the PFC converter 101 is extremely low, the waveform of the current flowing through the inductor L1 is shown as a triangular shaped wave using such a frequency as to be visible to the eye.

FIG. 3A is a waveform diagram for a continuous current mode and FIG. 3B is a waveform diagram for a discontinuous current mode. Thus, in the continuous current mode illustrated in FIG. 3A, for the current flowing through the inductor L1 of the PFC converter 101, there are no periods in which the current value becomes zero for each accumulation and discharge of excitation energy in and from the inductor L1 of the PFC converter 101. Whereas, in the discontinuous current mode illustrated in FIG. 3B, there are periods in which the current value becomes zero for each accumulation and discharge of excitation energy in and from the inductor L1 of the PFC converter 101.

Figure 4A:
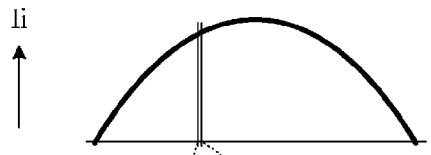
FIGS. 4A-4C are voltage and current waveform diagrams for the PFC converter 101 according to the first preferred embodiment of the present invention for a unit switching period in a state in which control is being performed in a continuous current mode.
Figure 4B:
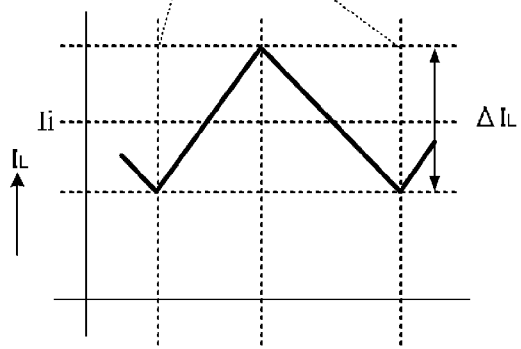
Figure 4C:
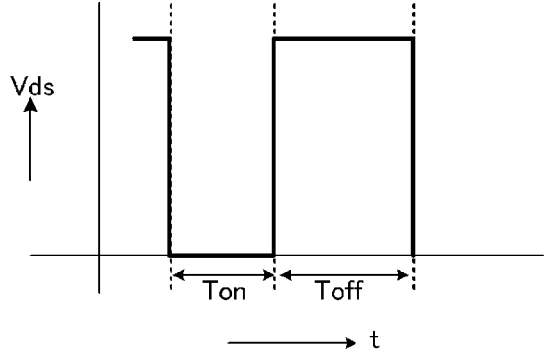

FIGS. 4A-4C provide voltage and current waveform diagrams for the PFC converter 101 for a unit switching period in a state in which control is performed in a continuous current mode.

The digital signal processing circuit 13 performs switching control such that the input current of the PFC converter 101, that is, the average value of the current flowing through the inductor L1, comes to have a similar shape to a full-wave rectified waveform. Thus, harmonics are suppressed and the power factor is improved as a result of an input current flowing that has a similar shape to and the same phase as the input voltage.

FIG. 4A is a current waveform of an average value Ii of a current flowing through the inductor L1 for a unit of half the period of the commercial power supply frequency, FIG. 4B is a waveform diagram of the current IL flowing through the inductor L1 in a unit switching period shown by magnifying part of the time axis of FIG. 4B, and FIG. 4C is a waveform diagram of the drain-source voltage Vds of the switching element Q1.

In the on period of the switching element Q1, the current IL flows through the inductor L1 and the current IL increases with a gradient determined by the voltage between the terminals of the inductor L1 and the inductance of the inductor L1. Thereafter, in the off period of the switching element Q1, the current IL decreases with a gradient determined by the voltage between the terminals of the inductor L1 and the inductance of the inductor L1. Thus, the current IL flowing through the inductor L1 changes by the switching period in the width of a current ripple $\Delta IL$.

Figure 5A:
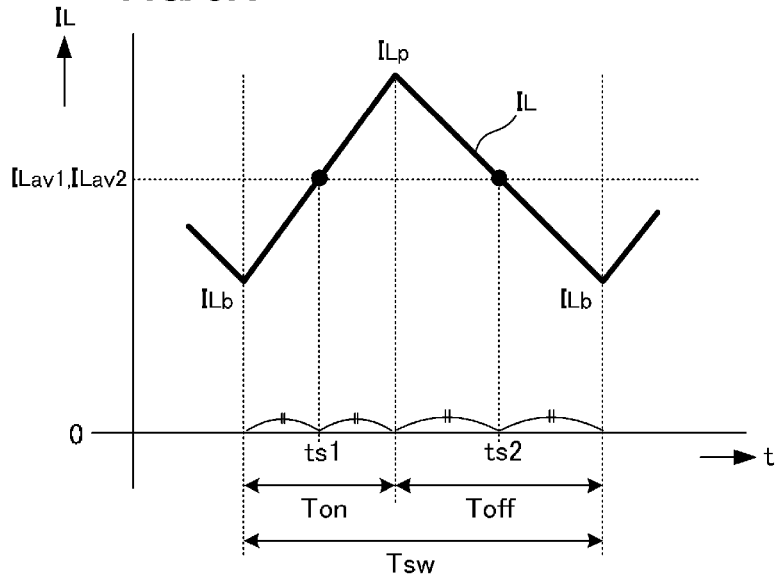
FIGS. 5A and 5B are diagrams illustrating a method of determining an operation mode in the PFC converter 101 according to the first preferred embodiment of the present invention.
Figure 5B:
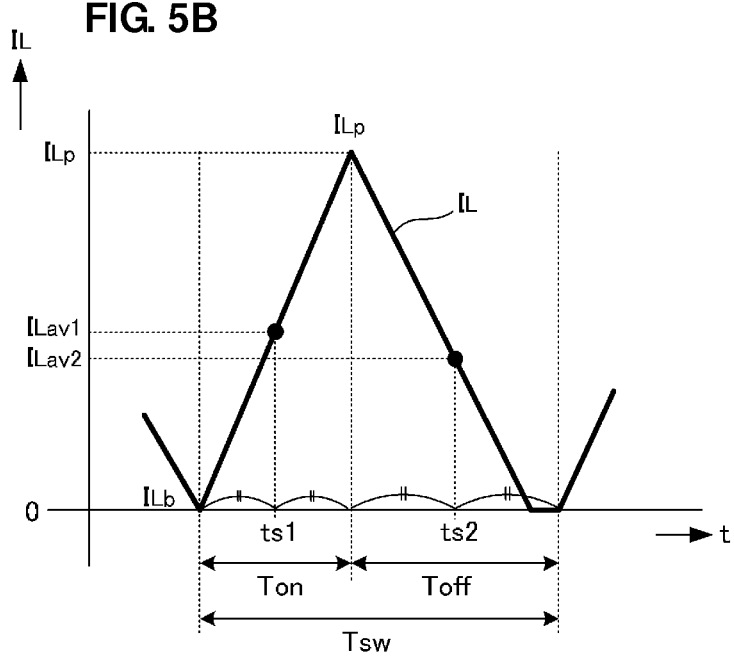

FIGS. 5A and 5B are diagrams illustrating a method of determining the operation mode. FIG. 5A is a waveform diagram of the inductor current in the continuous current mode and FIG. 5B is a waveform diagram of the inductor current in the discontinuous current mode.

When the value of the current flowing through the inductor L1 at the turn off timing of the switching element Q1 (peak value) is denoted by ILp and the value of the current flowing through the inductor L1 at the turn on timing of the switching element Q1 (lowest value) is denoted by ILb, the average value of the current flowing through the inductor L1 in the on period of the switching element Q1 (average current) is expressed by the following relationship:

$$I_{Lav}1=(ILp+ILb)/2 \quad (1).$$

The current flowing through the inductor L1 in the off period of the switching element Q1 linearly decreases and therefore when the operation mode is the continuous current mode an average current value $I_{Lav2}$ of the inductor L1 at a timing at the center of the off period of the switching element Q1 is equal to the average current value $I_{Lav1}$. On the other hand, when the operation mode is the discontinuous current mode, $I_{Lav1}>I_{Lav2}$ as illustrated in FIG. 5B.

Consequently, the digital signal processing circuit 13 finds a first current value ILav1 by performing sampling at a midpoint ts1 of the on period of the switching element Q1, finds a second current value ILav2 by performing sampling at a midpoint ts2 of the off period of the switching element Q1, and when $I_{Lav1}=I_{Lav2}$ the operation mode is determined to be the continuous current mode and when $I_{Lav1}>I_{Lav2}$ the operation mode is determined to be the discontinuous current mode.

The switching control signal provided to the gate of the switching element Q1 is a signal generated by the digital signal processing circuit 13 and the digital signal processing circuit 13 knows the timing ts1 at the center of the on period and the timing ts2 at the midpoint of the off period (under control). Accordingly, for example, without a timing signal being input from the outside, a falling voltage of the current detection resistor R3 can be sampled at the aforementioned timings.

If the operation mode has been determined to be the continuous current mode, the average value $I_{Lav}$ of the current flowing through the inductor L1 is determined by sampling the current flowing through the inductor L1 at a timing at the midpoint of the on period of the switching element Q1 and the on period Ton and the off period Toff of the switching element Q1 are controlled such that the average value $I_{Lav}$ changes in the form of a sine wave.

Furthermore, if the operation mode has been determined to be the discontinuous current mode, the on period Ton of the switching element Q1 is made to be constant throughout the period of the commercial power supply. In addition, the on period Ton is subjected to feedback control in accordance with the output voltage.

In the discontinuous current mode, in order to make the on period Ton of the switching element Q1 constant throughout the period of the commercial power supply, for example, control is performed using either of the following methods.

(1) While detecting the period of the commercial power supply, the digital signal processing circuit 13 changes the on period in units of the period of the commercial power supply.

(2) The responsiveness of a control unit ("voltage compensator" in circuit terminology), which detects an output voltage of the PFC converter 101 and subjects the length of the on period of the switching element Q1 to feedback control using the detected output voltage, is reduced to be in line with the period of the commercial power supply.

Second Preferred Embodiment

Figure 6:
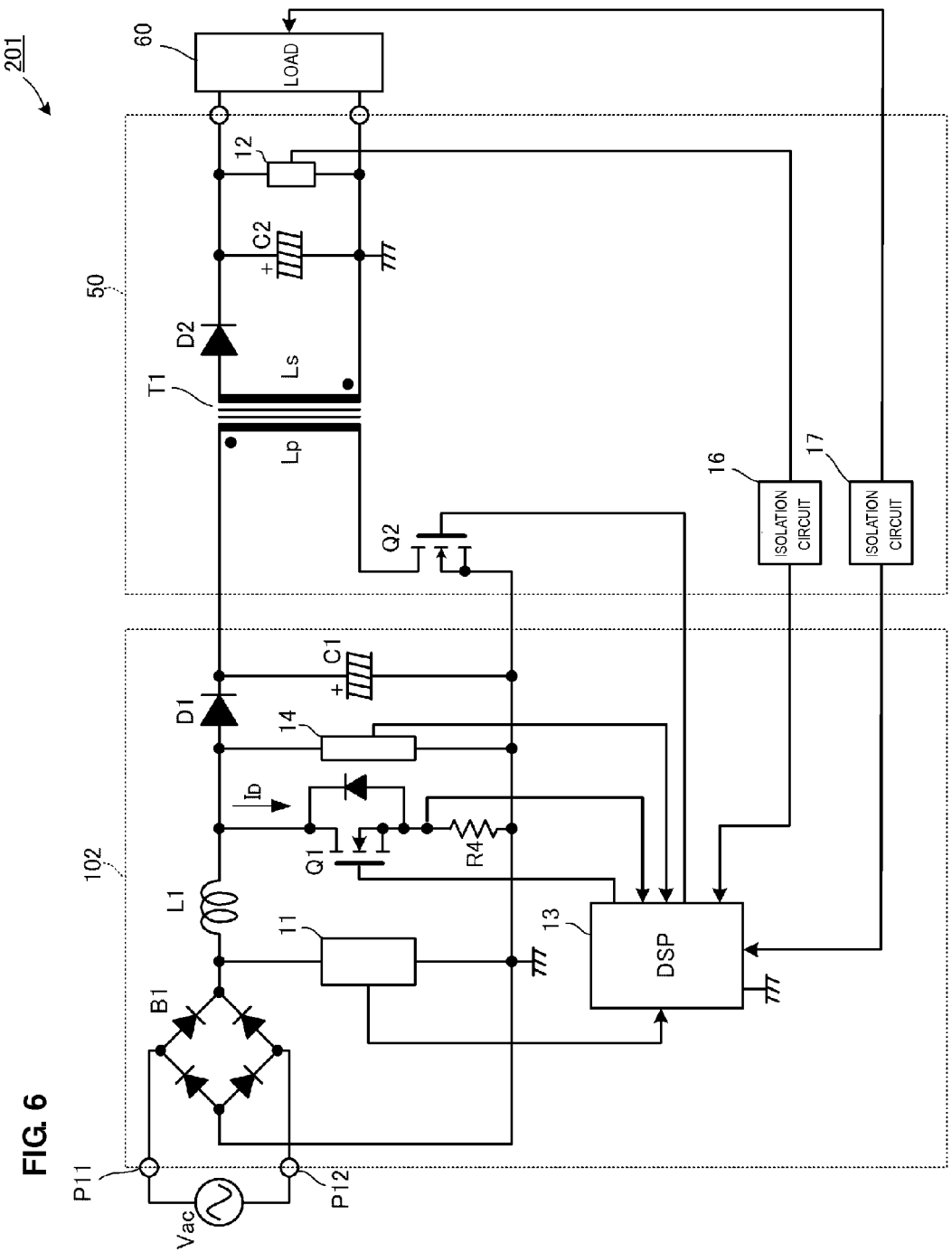
FIG. 6 is a circuit diagram of a switching power supply device 201 according to a second preferred embodiment of the present invention.

FIG. 6 is a circuit diagram of a switching power supply device 201 according to a second preferred embodiment of the present invention.

The switching power supply device 201 in FIG. 6 preferably includes a PFC converter 102 and a DC-DC converter 50. A load 60 is connected to the output of the DC-DC converter 50.

An alternating-current input power supply Vac, which is a commercial alternating-current power supply, is input to input ports P11 and P12 of the PFC converter 102 and the DC-DC converter 50 is connected to an output section of the PFC converter 102. The PFC converter 102 preferably includes a diode bridge B1 that full-wave rectifies the alternating-current input power supply Vac, an inductor L1 that is connected to the output of the diode bridge B1, a switching element Q1, a diode D1, a smoothing capacitor C1, a current detection resistor R4 that is connected in series with the switching element Q1, an input voltage detection circuit 11 and a switching element voltage detection circuit 14. A boost-type chopper circuit includes the inductor L1, the switching element Q1, the diode D1 and the smoothing capacitor C1.

The DC-DC converter 50 preferably includes a transformer T1, a switching element Q2 connected in series to a first coil Lp of the transformer T1, and a rectifying smoothing circuit that is connected to a second coil Ls of the transformer T1 and includes a diode D2 and a capacitor C2.

Furthermore, the digital signal processing circuit 13, which is provided on a first side of the transformer T1, outputs not only a switching control signal to the switching element Q1 of the PFC converter 102, but also outputs a switching control signal to the switching element Q2 of the DC-DC converter 50. In addition, a detection signal of the output voltage detection circuit 12 is input through an isolation circuit 16, whereby an output voltage is detected. Then, an output voltage of the DC-DC converter 50 is stabilized by, for example, controlling the on duty ratio of the switching element Q2.

Furthermore, the digital signal processing circuit 13 is input with a detection voltage of the input voltage detection circuit 11 of the PFC converter 102, a detection voltage of the output voltage detection circuit 12 and a falling voltage of the current detection resistor R4 and provides a switching control signal concerning the on period and the off period according to these values to the gate of the switching element Q1. In other words, the switching element Q1 is controlled such that the input current of the PFC converter 102 comes to have a similar shape to the waveform of the input voltage. In addition, the digital signal processing circuit 13 communicates with the load 60 through an isolation circuit 17, sends the states of the PFC converter 102 and the DC-DC converter 50 to the load 60, and reflects a load state and the like received from the load 60 in the switching control.

The digital signal processing circuit 13, as will be described below, reads out a detection voltage of the switching element voltage detection circuit 14 during the off period of the switching element Q1 and determines the operation mode on the basis of the change in the voltage between the terminals of the switching element Q1.

Figure 7A:
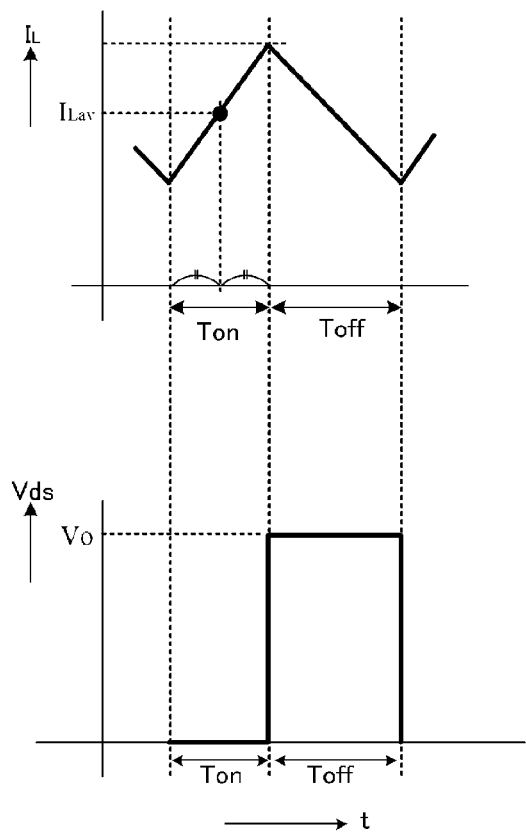
FIGS. 7A and 7B are diagrams illustrating a method of determining an operation mode used by a digital signal processing circuit 13 in the switching power supply device 201 according to the second preferred embodiment of the present invention.
Figure 7B:
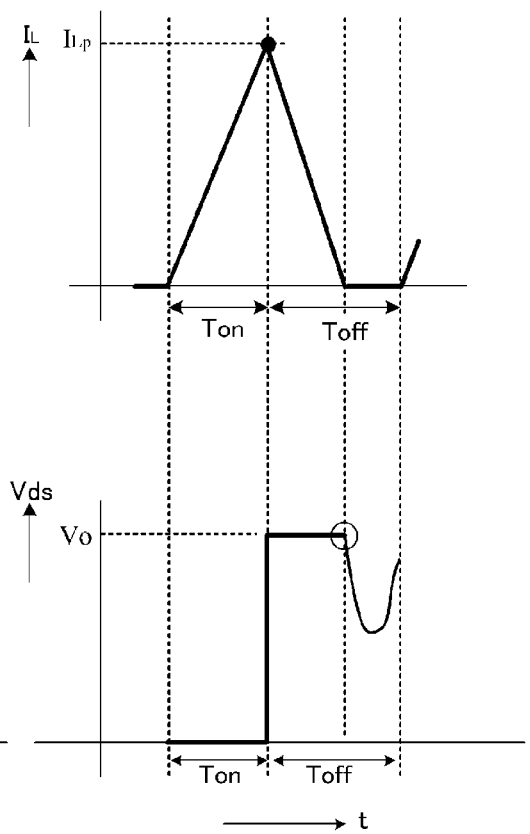

FIGS. 7A and 7B are diagrams illustrating a method of determining an operation mode used by the digital signal processing circuit 13.

An average value $I_{Lav}$ of the current flowing through the inductor L1 in the on period of the switching element Q1 is determined by sampling the voltage of the current detection resistor R4 at the midpoint of the on period of the switching element Q1. Furthermore, the peak value ILp of the current flowing through the inductor L1 is determined by sampling the detection voltage of the switching element voltage detection circuit 14 immediately before the switching element Q1 is turned off.

If the operation mode is the continuous current mode, as illustrated in FIG. 7A, when the switching element Q1 is turned off, in the off period, the diode D1 continues to be turned on, and therefore the voltage between the terminals of the switching element Q1 becomes the output voltage V0 of the PFC converter 102.

If the operation mode is the discontinuous current mode, as illustrated in FIG. 7B, up until the turn on timing of the switching element Q1 is reached, conduction in the diode D1 is stopped and therefore the voltage Vds between the terminals of the switching element Q1 falls due to the resonance between the parasitic capacitance within the circuit and the first coil Lp of the transformer T1.

Therefore, if the voltage Vds between the terminals in the off period of the switching element Q1 is examined and it is constantly equal to Vo, the operation mode is regarded as being the continuous current mode, whereas if Vds falls, the operation mode is regarded as being the discontinuous current mode.

If the operation mode has been determined to be the continuous current mode, the average value $I_{Lav}$ of the current flowing through the inductor L1 is determined by sampling the current flowing through the inductor L1 at a timing at the midpoint of the on period of the switching element Q1 and the on period Ton and the off period Toff of the switching element Q1 are controlled such that the average value $I_{Lav}$ changes in the form of a sine wave.

In addition, if the operation mode has been determined to be the discontinuous current mode, the on period Ton of the switching element Q1 is made to be constant throughout the period of the commercial power supply. Furthermore, the on period Ton is subjected to feedback control in accordance with the output voltage.

The control method in which the on period Ton of the switching element Q1 is made to be constant throughout the period of the commercial power supply in the discontinuous current mode is the same as the method described in the first preferred embodiment. In other words, either of the following methods can be used: (1) a method in which the digital signal processing circuit 13 changes the on period in units of the period of the commercial power supply while detecting the period of the commercial power supply, and (2) a method in which the responsiveness of a control unit (voltage compensator), which detects an output voltage of the PFC converter 102 and subjects the length of the on period of the switching element Q1 to feedback control using the output voltage, is reduced to be in line with the period of the commercial power supply. In the case where control is performed using method (2), the digital signal processing circuit 13 illustrated in FIG. 6 may use the output voltage of the DC-DC converter 50 as a value that is proportional to the output voltage of the PFC converter 102.

Third Preferred Embodiment

Figure 8:
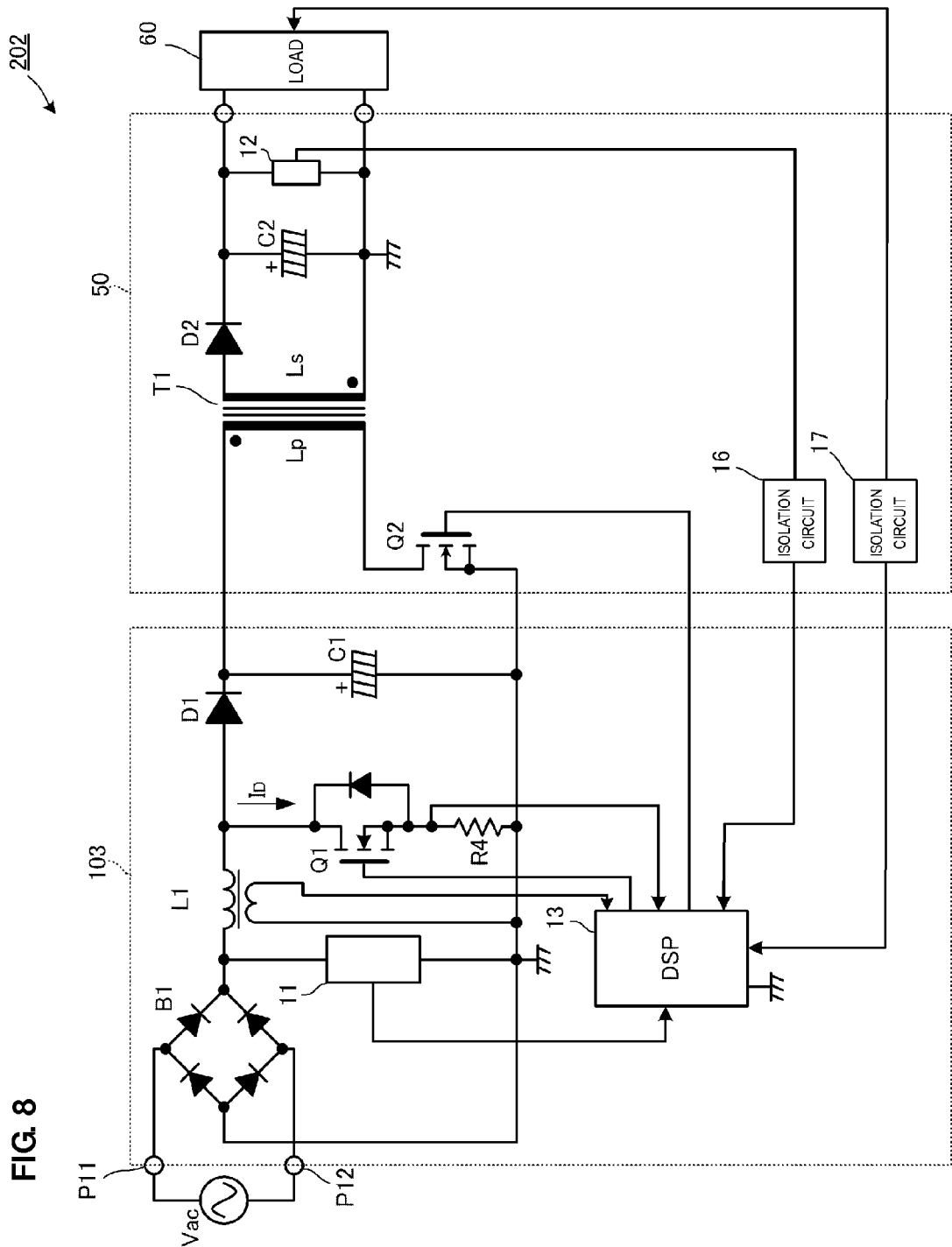
FIG. 8 is a circuit diagram of a switching power supply device 202 according to a third preferred embodiment of the present invention.

FIG. 8 is a circuit diagram of a switching power supply device 202 according to a third preferred embodiment of the present invention.

The switching power supply device 202 in FIG. 8 preferably includes a PFC converter 103 and a DC-DC converter 50. A load 60 is connected to the output of the DC-DC converter 50.

An alternating-current input power supply Vac, which is a commercial alternating-current power supply, is input to input ports P11 and P12 of the PFC converter 103 and the DC-DC converter 50 is connected to an output section of the PFC converter 103. The PFC converter 103 preferably includes a diode bridge B1 that full-wave rectifies the alternating-current input power supply Vac, an inductor L1 that is connected to the output of the diode bridge B1, a switching element Q1, a diode D1, a smoothing capacitor C1, a current detection resistor R4 that is connected in series with the switching element Q1 and an input voltage detection circuit 11. A boost-type chopper circuit preferably includes the inductor L1, the switching element Q1, the diode D1 and the smoothing capacitor C1.

The difference from the switching power supply device 201 illustrated in FIG. 6 is that the switching element voltage detection circuit 14 is replaced with the inductor L1 including an auxiliary coil. Other components are preferably the same as those illustrated in FIG. 6.

The digital signal processing circuit 13, as will be described below, reads out the voltage of the auxiliary coil of the inductor L1 during the off period of the switching element Q1 and determines the operation mode on the basis of the change in this voltage.

Figure 9A:
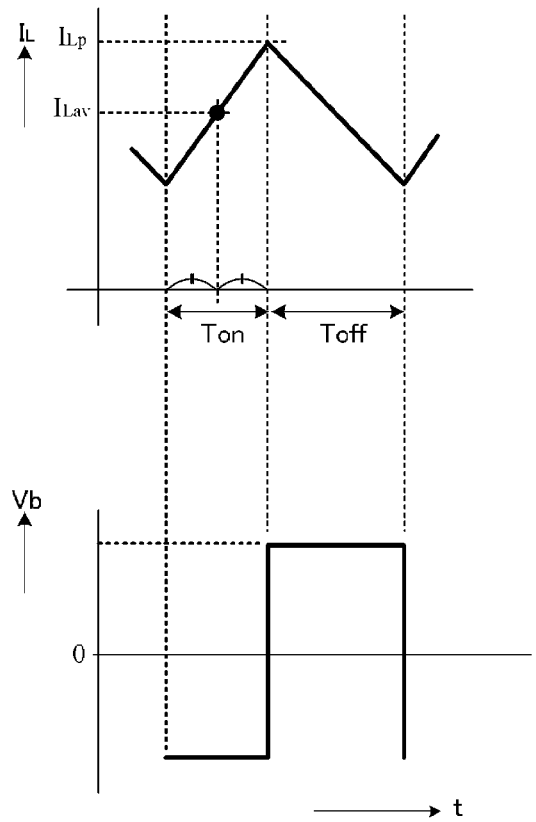
FIGS. 9A and 9B are diagrams illustrating a method of determining an operation mode used by the digital signal processing circuit 13 in the switching power supply device 202 according to the third preferred embodiment of the present invention.
Figure 9B:
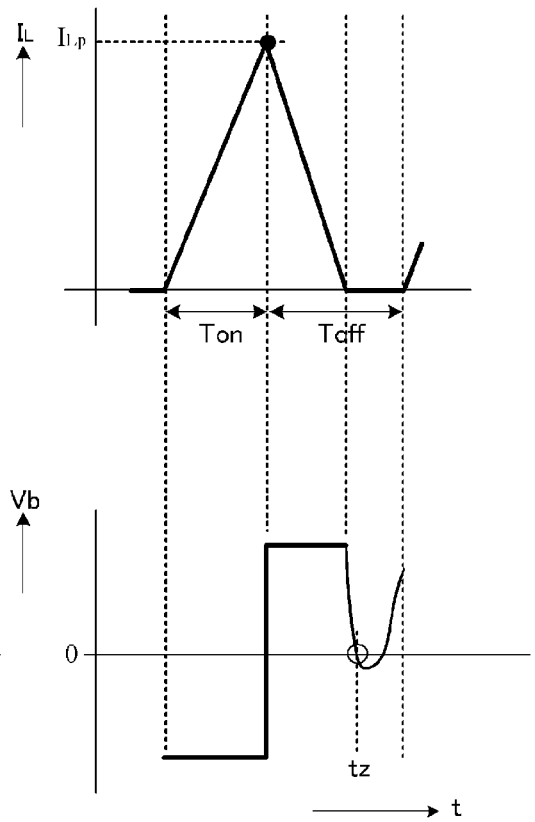

FIGS. 9A and 9B show diagrams illustrating a method of determining an operation mode used by the digital signal processing circuit 13.

An average value ILav of the current flowing through the inductor L1 in the on period of the switching element Q1 is determined by sampling the voltage of the current detection resistor R4 at the midpoint of the on period of the switching element Q1.

If the operation mode is the continuous current mode, as illustrated in FIG. 9A, when the switching element Q1 is turned off, the diode D1 continues to be turned on in the off period and therefore the voltage Vb of the auxiliary coil is the product of the output voltage Vo of the PFC converter 103 and a turn ratio between the main coil and the auxiliary coil.

If the operation mode is the discontinuous current mode, as illustrated in FIG. 9B, up until the turn on timing of the switching element Q1 is reached, conduction in the diode D1 is stopped and therefore the voltage Vb of the auxiliary coil of the inductor L1 falls due to the resonance between the main coil of the inductor L1 and the parasitic capacitance within the circuit and the time point tz occurs at which the voltage Vb becomes less than 0 V.

Therefore, if the voltage Vb of the auxiliary coil of the inductor L1 in the off period of Q1 is examined and it is continuously constant, the operation mode is regarded as being the continuous current mode, whereas if there is a time point at which the voltage Vb becomes zero or a negative voltage, the operation mode is regarded as being the discontinuous current mode.

If the operation mode has been determined to be the continuous current mode, the average value ILav of the current flowing through the inductor L1 is determined by sampling the current flowing through the inductor L1 at a timing at the midpoint of the on period of the switching element Q1 and the on period Ton and the off period Toff of the switching element Q1 are controlled such that the average value ILav changes in the form of a sine wave.

In addition, if the operation mode has been determined to be the discontinuous current mode, the on period Ton of the switching element Q1 is made to be constant throughout the period of the commercial power supply. Furthermore, the on period Ton is subjected to feedback control in accordance with the output voltage.

The method of control used by the digital signal processing circuit 13 when the operation mode is the discontinuous current mode is preferably the same as that in the first and second preferred embodiments.

Fourth Preferred Embodiment

Figure 10A:
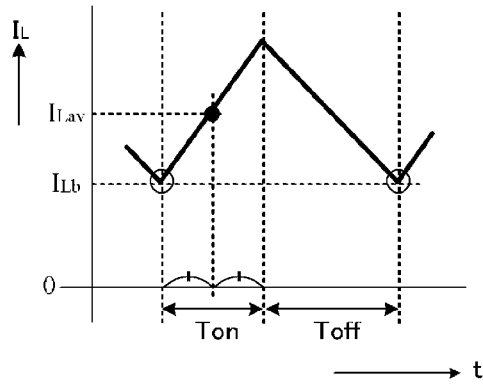
FIGS. 10A and 10B are diagrams illustrating a method of determining an operation mode of a PFC converter according to a fourth preferred embodiment of the present invention.
Figure 10B:
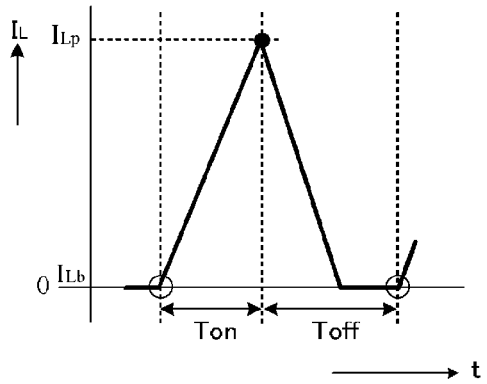

FIGS. 10A and 10B are diagrams illustrating a method of determining an operation mode of a PFC converter according to a fourth preferred embodiment. The configuration of the PFC converter is preferably the same as that of the first preferred embodiment illustrated in FIG. 2. The digital signal processing circuit 13 determines the operation mode on the basis of the value of the current flowing through the inductor L1 at a predetermined timing.

If the operation mode is the continuous current mode, as illustrated in FIG. 10A, a current ILb flows through the inductor L1 at a turn on timing of the switching element Q1. If the current value ILb is not zero, the operation mode is determined to be the continuous current mode.

On the other hand, if the operation mode is the discontinuous current mode, the current ILb in the inductor L1 at the turn on timing of the switching element Q1 is zero. Accordingly, if the current ILb is zero, the operation mode can be determined to be the discontinuous current mode or a critical mode.

If the operation mode has been determined to be the continuous current mode, the average value ILav of the current flowing through the inductor L1 is determined by sampling the current flowing through the inductor L1 at a timing at the midpoint of the on period of the switching element Q1 and the on period Ton and the off period Toff of the switching element Q1 are controlled such that the average value ILav changes in the form of a sine wave.

In addition, if the operation mode has been determined to be the discontinuous current mode, the on period Ton of the switching element Q1 is made to be constant throughout the period of the commercial power supply. Furthermore, the on period Ton is subjected to feedback control in accordance with the output voltage.

Fifth Preferred Embodiment

Figure 11A:
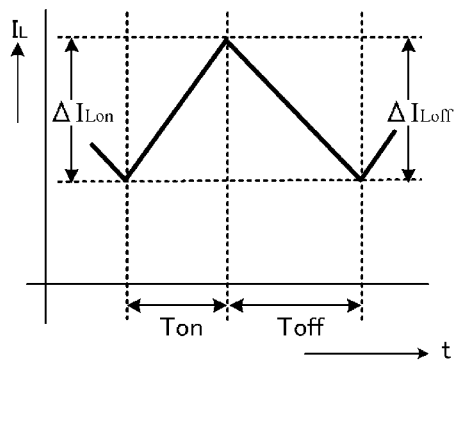
FIGS. 11A and 11B are diagrams illustrating a method of determining an operation mode of a PFC converter according to a fifth preferred embodiment of the present invention.
Figure 11B:
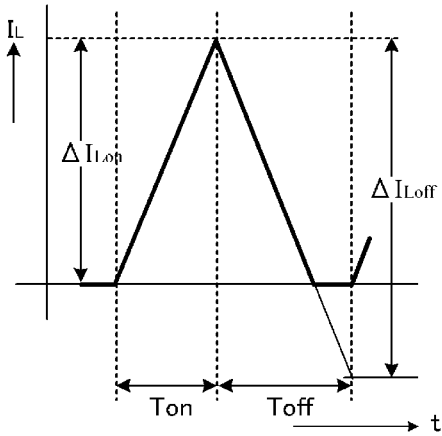

FIGS. 11A and 11B are diagrams illustrating a method of determining an operation mode of a PFC converter according to a fifth preferred embodiment. The configuration of the PFC converter is preferably the same as that of the first preferred embodiment illustrated in FIG. 2. The digital signal processing circuit 13 determines the operation mode on the basis of the change in the current flowing through the inductor L1.

When the inductance value of the inductor L1 is denoted by L, the alternating-current voltage input from the alternating-current input power supply (commercial power supply) is denoted by Vin, the output voltage of the PFC converter is denoted by Vo, the on period and the off period of the switching element Q1 are denoted by Ton and Toff, the change in the current flowing through the inductor L1 in the on period of the switching element Q1 is denoted by $\Delta I_{Lon}$, and the change in the current flowing through the inductor L1 in the off period of the switching element Q1 is denoted by $\Delta I_{Loff}$:

$$\Delta I_{Lon} = (Vin/L)Ton \quad (2)$$

$$\Delta I_{Loff} = \{(Vo-Vin)/L\}Toff \quad (3).$$

When the operation mode is the continuous current mode, as illustrated in FIG. 11A, $\Delta ILon = \Delta ILoff$.

When the operation mode is the discontinuous current mode, as illustrated in FIG. 11B, $\Delta ILon < \Delta ILoff$. However, this does not mean that a current is flowing through the inductor throughout the entirety of the off period Toff in the discontinuous current mode and $\Delta ILoff$ is a virtual value.

Figure 12A:
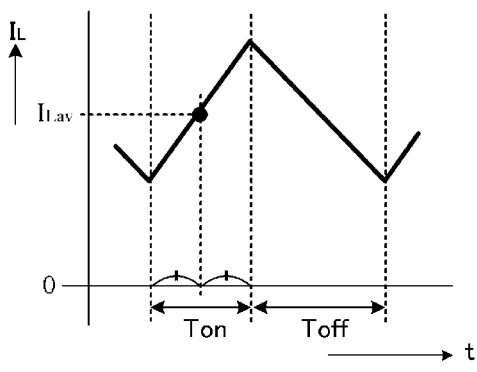
FIGS. 12A and 12B are diagrams illustrating the method of determining an operation mode of the PFC converter according to the fifth preferred embodiment of the present invention and illustrating a method of determining an operation mode on the basis of an average current value $I_{Lav}$ of an on period of a switching element Q1.
Figure 12B:
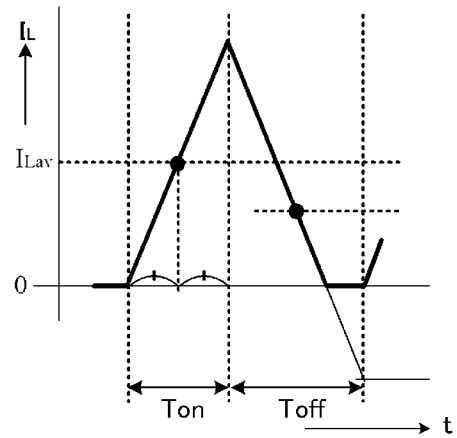

FIGS. 12A and 12B are diagrams illustrating a method of determining an operation mode using the polarity of a difference of an average current value ILav during the on period of the switching element Q1 by using the above-described relation.

When the operation mode is the continuous current mode, $I_{Lav} > \Delta ILoff/2 = (\frac{1}{2}) \times \{(Vo-Vin)/L\}Toff \ldots (4)$, and when the operation mode is the discontinuous current mode $I_{Lav} < \Delta ILoff/2 = (\frac{1}{2}) \times \{(Vo-Vin)/L\}Toff \ldots (5)$.

Therefore, from $Ij = I_{Lav} - (\frac{1}{2}) \times \{(Vo-Vin)/L\}Toff \ldots (6)$, when Ij>0, the operation mode is determined to be the continuous current mode, and when Ij<0, the operation mode is determined to be the discontinuous current mode.

The average current value $I_{Lav}$ in the on period of the switching element Q1 is determined by performing sampling at the midpoint of the on period. In addition, Vo and Vin are also determined by sampling. The inductance of the inductor L1 is known in advance and therefore the evaluation value Ij is calculated on the basis of these values and the operation mode is determined by determining the polarity of this value.

Sixth Preferred Embodiment

Figure 13A:
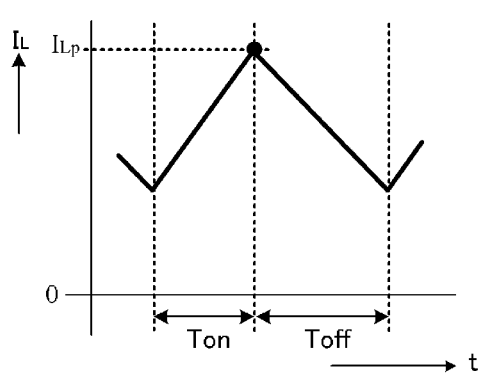
FIGS. 13A and 13B are diagrams illustrating a method of determining an operation mode of a PFC converter according to a sixth preferred embodiment of the present invention.
Figure 13B:
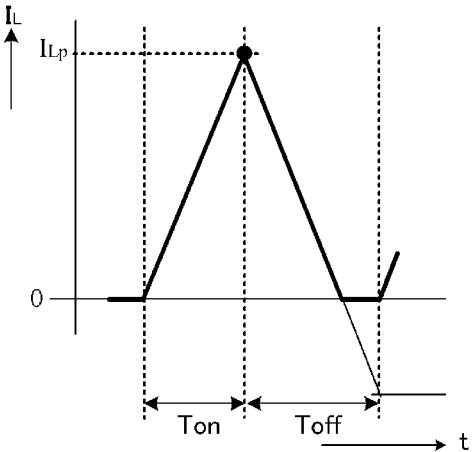

FIG. 13 shows diagrams illustrating a method of determining an operation mode of a PFC converter according to a sixth preferred embodiment of the present invention. The configuration of the PFC converter is the same as that of the first preferred embodiment illustrated in FIG. 2. The digital signal processing circuit 13 determines the operation mode on the basis of the change in the current flowing through the inductor L1.

If the peak current immediately before turning off of the switching element Q1 is denoted by ILp, when the operation mode is the continuous current mode, $ILp > \Delta ILoff = \{(Vo-Vin)/L\}Toff \ldots (7)$, and when the operation mode is the discontinuous current mode, $ILp < \Delta ILoff = \{(Vo-Vin)/L\}Toff \ldots (8)$.

Therefore, from $Ij = ILp - \{(Vo-Vin)/L\}Toff \ldots (9)$, when Ij>0, the operation mode is determined to be the continuous current mode, and when Ij<0, the operation mode is determined to be the discontinuous operation mode.

The peak current ILp is determined by performing sampling immediately before turning off of the switching element Q1. In addition, Vo and Vin are also determined by sampling. The inductance of the inductor L1 is known in advance and therefore the evaluation value Ij is calculated on the basis of these values, and the operation mode is determined by determining the polarity of this value.

Seventh Preferred Embodiment

Figure 14:
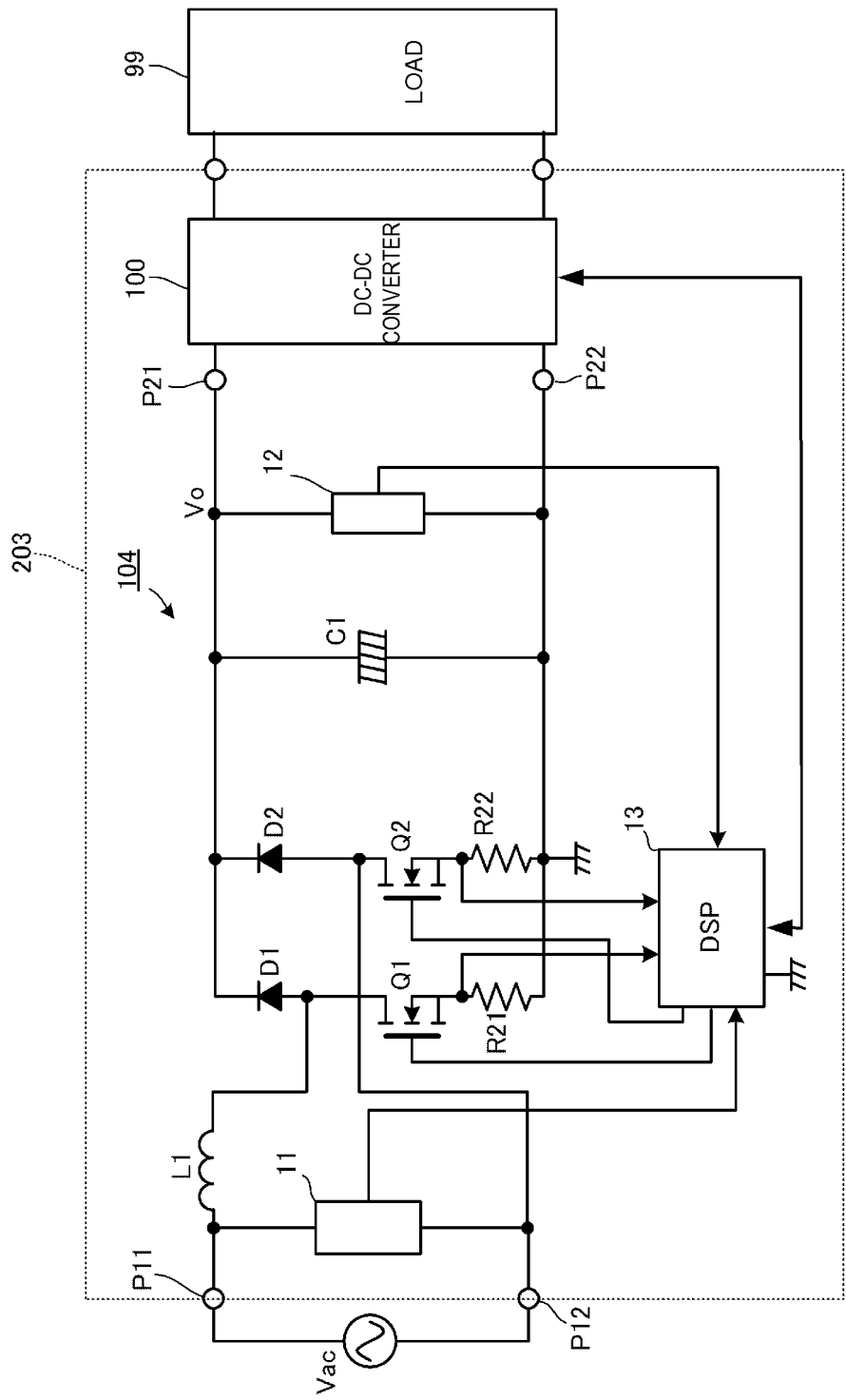
FIG. 14 is a circuit diagram of a switching power supply device 203 according to a seventh preferred embodiment of the present invention.

FIG. 14 is a circuit diagram of a switching power supply device 203 according to a seventh preferred embodiment of the present invention. Furthermore, FIGS. 15A-15D show diagrams illustrating current paths at four timings in a PFC converter 104.

The PFC converter 104 illustrated in FIG. 14 preferably includes one inductor and two switching elements without a diode bridge interposed therebetween and is a diode-bridge-less PFC converter.

In FIG. 14, symbols P11 and P12 denote input terminals of the PFC converter 104 and symbols P21 and P22 denote output terminals of the PFC converter 104. An alternating-current input power supply Vac, which is a commercial alternating-current power supply, is input to the input terminals P11 and P12 and a DC-DC converter 100 is connected to the output terminals P21 and P22.

A load 99 is connected to the output of the DC-DC converter 100 and a direct-current voltage that has been stabilized by the DC-DC converter 100 is supplied thereto.

An input voltage detection circuit 11 is provided in an input stage of the PFC converter 104 and an inductor L1 is connected in series thereto on a single line. A bridge circuit based on diodes D1 and D2 and switching elements Q1 and Q2 is connected next to the inductor L1. Current detection resistors R21 and R22 are connected between the sources and grounds of the switching elements Q1 and Q2. A smoothing circuit including a smoothing capacitor C1 is connected in parallel with the output of the bridge circuit.

Figure 15A:
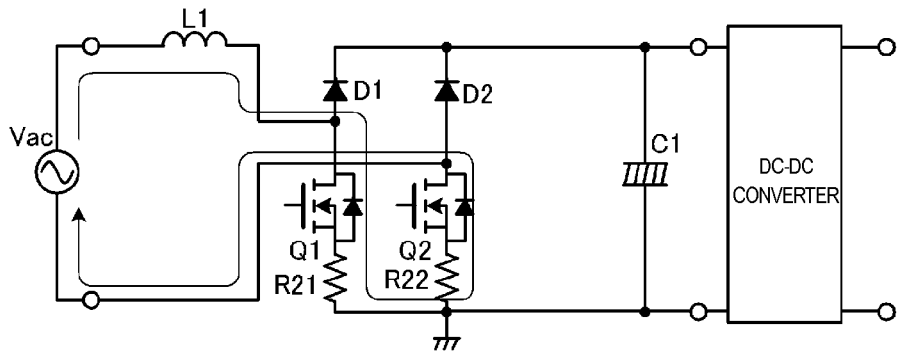
FIGS. 15A-15D are diagrams illustrating current paths at four timings in a PFC converter 104 in FIG. 14.
Figure 15B:
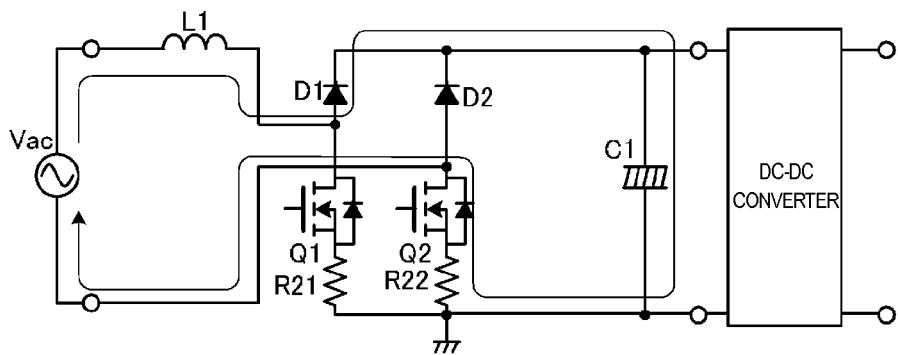

FIG. 15A illustrates a current path in the positive half of the cycle of the alternating-current input power supply when the switching elements Q1 and Q2 are both in an on state and FIG. 15B illustrates a current path in the positive half of the cycle of the alternating-current input power supply when the switching elements Q1 and Q2 are both in an off state.

Figure 15C:
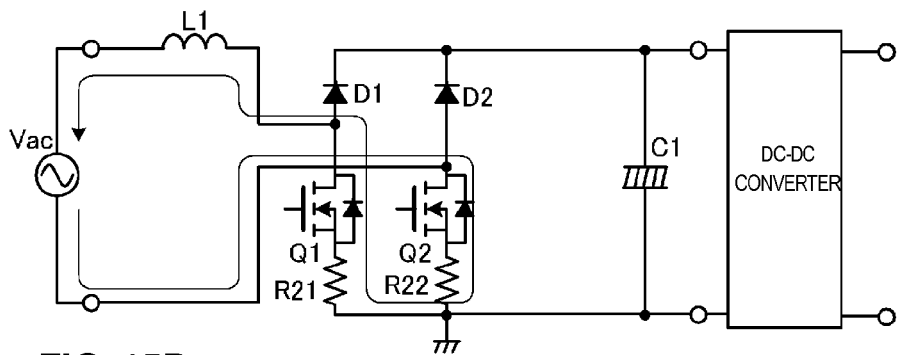
Figure 15D:
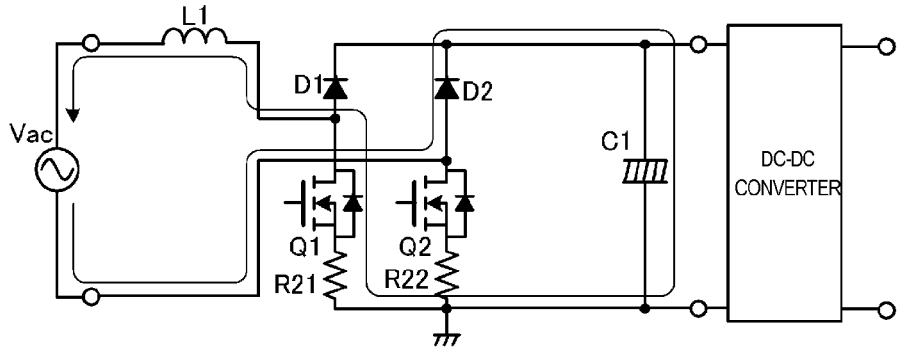

Furthermore, FIG. 15C illustrates a current path in the negative half of the cycle of the alternating-current input power supply when the switching elements Q1 and Q2 are both in an on state and FIG. 15D illustrates a current path in the negative half of the cycle of the alternating-current input power supply when the switching elements Q1 and Q2 are both in an off state.

In the positive half of the cycle of the alternating-current input power supply, when Q1 and Q2 are in the on state, a current flows through the path illustrated in FIG. 15A and excitation energy accumulates in the inductor L1, and when Q1 and Q2 are in the off state, a current flows through the path illustrated in FIG. 15B and the excitation energy is discharged from the inductor L1. At this time, a current flows through a parasitic diode of Q2. Similarly, in the negative half of the cycle of the alternating-current input power supply, when Q1 and Q2 are in the on state, a current flows through the path illustrated in FIG. 15C and excitation energy accumulates in the inductor L1, and when Q1 and Q2 are in the off state, at the timing illustrated in FIG. 15D, the excitation energy is discharged from the inductor L1. At this time, a current flows through a parasitic diode of Q1.

The current detection resistor R21 is provided in order to detect the current flowing through the inductor L1 in the on period of Q1 in the positive half of the cycle of the alternating-current input power supply. In addition, the current detection resistor R22 is provided in order to detect the current flowing through the inductor L1 in the on period of Q2 in the negative half of the cycle of the alternating-current input power supply. The digital signal processing circuit 13 illustrated in FIGS. 11A and 11B detects an average value of the current flowing through the inductor L1 by sampling the falling voltages of the current detection resistors R21 and R22 in the centers of the on periods of the switching elements Q1 and Q2.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power factor correction converter comprising:
a rectifier circuit that rectifies an alternating-current voltage input from an alternating-current input power supply;
a series circuit that is connected to the rectifier circuit and includes an inductor and a switching element;
a rectifying smoothing circuit that is connected in parallel with the switching element;
a switching controller that controls the switching element such that an input current input from the alternating-current input power supply is caused to have a similar shape to the alternating-current voltage;
a current detector that detects a current flowing through the inductor; and
an operation mode determination unit that determines whether an operation mode is a continuous current mode or a discontinuous current mode; wherein
in a case where the operation mode is the continuous current mode, the switching controller controls the switching element such that an average value of the current flowing through the inductor detected by the current detector changes in the form of a sine wave and in a case where the operation mode is the discontinuous current mode, the switching controller controls an on period of the switching element to be constant throughout a voltage change period of the alternating-current input power supply such that a peak value of the current flowing through the inductor changes in the form of a sine wave; and
when L denotes an inductance value of the inductor, Vin denotes the alternating-current voltage, Vo denotes an output voltage of the power factor correction converter, Ton denotes the on period and Toff denotes an off period of the switching element, and a detection value of a current sampled by the current detector at a midpoint of the on period of the switching element is denoted by $I_{Lav}$, when $I_{Lav} - (1/2) \times \{(Vo-Vin)/L\} \times Toff$ is positive, the operation mode determination unit determines that the operation mode is the continuous current mode and when $I_{Lav} - (1/2) \times \{(Vo-Vin)/L\} \times Toff$ is negative, the operation mode determination unit determines that the operation mode is the discontinuous current mode.

2. A power factor correction converter comprising:
a first series circuit that is connected in parallel with output ports and includes a first switching element and a first rectifying element;
an inductor that is connected between a connection point of the first switching element and the first rectifying element and a first input terminal of an alternating-current input power supply;
a second series circuit that is connected in parallel with the output ports, includes a second switching element and a second rectifying element and in which a connection point of the second switching element and the second rectifying element is connected to a second input terminal of the alternating-current input power supply;
a smoothing circuit that is connected in parallel with the output ports;
a switching controller that controls the switching element such that an input current input from the alternating-current input power supply is caused to have a similar shape to an alternating-current input power supply voltage;
a current detector that detects a current flowing through the inductor; and
an operation mode determination unit arranged to determine whether an operation mode is a continuous current mode or a discontinuous current mode; wherein
in a case where the operation mode is the continuous current mode, the switching controller controls the switching element such that an average value of the current flowing through the inductor detected by the current detector changes in the form of a sine wave and in a case where the operation mode is the discontinuous current mode, the switching controller controls an on period of the switching element to be constant throughout a voltage change period of the alternating-current input power supply such that a peak value of the current flowing through the inductor changes in the form of a sine wave; and
when L denotes an inductance value of the inductor, Vin denotes the alternating-current voltage, Vo denotes an output voltage of the power factor correction converter, Ton denotes the on period and Toff denotes an off period of the switching element, and a detection value of a current sampled by the current detector at a midpoint of the on period of the switching element is denoted by $I_{Lav}$, when $I_{Lav} - (½) \times \{(Vo-Vin)/L\} \times Toff$ is positive, the operation mode determination unit determines that the operation mode is the continuous current mode and when $I_{Lav} - (½) \times \{(Vo-Vin)/L\} \times Toff$ is negative, the operation mode determination unit determines that the operation mode is the discontinuous current mode.

3. The power factor correction converter according to claim 1, further comprising a switching element voltage detection circuit that detects a voltage between terminals of the switching element, wherein the operation mode determination unit makes the determination on the basis of a change in a voltage detected by the switching element voltage detection circuit during the off period of the switching element.

4. The power factor correction converter according to claim 1, further comprising an auxiliary coil that is coupled with the inductor, wherein the operation mode determination unit makes the determination on the basis of a change in a voltage generated in the auxiliary coil during the off period of the switching element.

5. The power factor correction converter according to claim 1, wherein the switching controller and the operation mode detection unit include a digital signal processor that holds a digital value detected by the current detector.

6. The power factor correction converter according to claim 2, further comprising a switching element voltage detection circuit that detects a voltage between terminals of the switching element, wherein the operation mode determination unit makes the determination on the basis of a change in a voltage detected by the switching element voltage detection circuit during the off period of the switching element.

7. The power factor correction converter according to claim 2, further comprising an auxiliary coil that is coupled with the inductor, wherein the operation mode determination unit makes the determination on the basis of a change in a voltage generated in the auxiliary coil during the off period of the switching element.

8. The power factor correction converter according to claim 2, wherein the switching controller and the operation mode detection unit include a digital signal processor that holds a digital value detected by the current detector.

9. A power factor correction converter comprising:
a rectifier circuit that rectifies an alternating-current voltage input from an alternating-current input power supply;
a series circuit that is connected to the rectifier circuit and includes an inductor and a switching element;
a rectifying smoothing circuit that is connected in parallel with the switching element;
a switching controller that controls the switching element such that an input current input from the alternating-current input power supply is caused to have a similar shape to the alternating-current voltage;
a current detector that detects a current flowing through the inductor; and
an operation mode determination unit that determines whether an operation mode is a continuous current mode or a discontinuous current mode; wherein
in a case where the operation mode is the continuous current mode, the switching controller controls the switching element such that an average value of the current flowing through the inductor detected by the current detector changes in the form of a sine wave and in a case where the operation mode is the discontinuous current mode, the switching controller controls an on period of the switching element to be constant throughout a voltage change period of the alternating-current input power supply such that a peak value of the current flowing through the inductor changes in the form of a sine wave; and
when L denotes an inductance value of the inductor, Vin denotes the alternating-current voltage, Vo denotes an output voltage of the power factor correction converter, Ton denotes the on period and Toff denotes an off period of the switching element, and a detection value of a current sampled by the current detector at an endpoint of the on period of the switching element is denoted by ILp, when $ILp - \{(Vo-Vin)/L\} \times Toff$ is positive, the operation mode determination unit determines that the operation mode is the continuous current mode and when $ILp - \{(Vo-Vin)/L\} \times Toff$ is negative, the operation mode determination unit determines that the operation mode is the discontinuous current mode.

10. The power factor correction converter according to claim 9, further comprising a switching element voltage detection circuit that detects a voltage between terminals of the switching element, wherein the operation mode determination unit makes the determination on the basis of a change in a voltage detected by the switching element voltage detection circuit during the off period of the switching element.

11. The power factor correction converter according to claim 9, further comprising an auxiliary coil that is coupled with the inductor, wherein the operation mode determination unit makes the determination on the basis of a change in a voltage generated in the auxiliary coil during the off period of the switching element.

12. The power factor correction converter according to claim 9, wherein the switching controller and the operation mode detection unit include a digital signal processor that holds a digital value detected by the current detector.

13. A power factor correction converter comprising:
a first series circuit that is connected in parallel with output ports and includes a first switching element and a first rectifying element;
an inductor that is connected between a connection point of the first switching element and the first rectifying element and a first input terminal of an alternating-current input power supply;
a second series circuit that is connected in parallel with the output ports, includes a second switching element and a second rectifying element and in which a connection point of the second switching element and the second rectifying element is connected to a second input terminal of the alternating-current input power supply;
a smoothing circuit that is connected in parallel with the output ports;
a switching controller that controls the switching element such that an input current input from the alternating-current input power supply is caused to have a similar shape to an alternating-current input power supply voltage;
a current detector that detects a current flowing through the inductor; and
an operation mode determination unit arranged to determine whether an operation mode is a continuous current mode or a discontinuous current mode; wherein
in a case where the operation mode is the continuous current mode, the switching controller controls the switching element such that an average value of the current flowing through the inductor detected by the current detector changes in the form of a sine wave and in a case where the operation mode is the discontinuous current mode, the switching controller controls an on period of the switching element to be constant throughout a voltage change period of the alternating-current input power supply such that a peak value of the current flowing through the inductor changes in the form of a sine wave; and when L denotes an inductance value of the inductor, Vin denotes the alternating-current voltage, Vo denotes an output voltage of the power factor correction converter, Ton denotes the on period and Toff denotes an off period of the switching element, and a detection value of a current sampled by the current detector at an endpoint of the on period of the switching element is denoted by ILp, when ILp−{(Vo−Vin)/L}×Toff is positive, the operation mode determination unit determines that the operation mode is the continuous current mode and when ILp−{(Vo−Vin)/L}×Toff is negative, the operation mode determination unit determines that the operation mode is the discontinuous current mode.

14. The power factor correction converter according to claim 13, further comprising a switching element voltage detection circuit that detects a voltage between terminals of the switching element, wherein the operation mode determination unit makes the determination on the basis of a change in a voltage detected by the switching element voltage detection circuit during the off period of the switching element.

15. The power factor correction converter according to claim 13, further comprising an auxiliary coil that is coupled with the inductor, wherein the operation mode determination unit makes the determination on the basis of a change in a voltage generated in the auxiliary coil during an off period of the switching element.

16. The power factor correction converter according to claim 13, wherein the switching controller and the operation mode detection unit include a digital signal processor that holds a digital value detected by the current detector.

* * * * *